US007776119B2

(12) United States Patent
Notaras et al.

(10) Patent No.: US 7,776,119 B2
(45) Date of Patent: Aug. 17, 2010

(54) AIR FILTER ARRANGEMENT

(76) Inventors: John A. Notaras, 9 Fred Street, Lilyfield, New South Wales 2040 (AU); Angelo L. Notaras, 9 Fred Street, Lilyfield, New South Wales 2040 (AU)

( * ) Notice: Subject to any disclaimer, the term of this patent is extended or adjusted under 35 U.S.C. 154(b) by 735 days.

(21) Appl. No.: 10/588,208

(22) PCT Filed: Feb. 2, 2005

(86) PCT No.: PCT/AU2005/000136

§ 371 (c)(1), (2), (4) Date: Apr. 4, 2007

(87) PCT Pub. No.: WO2005/075808

PCT Pub. Date: Aug. 18, 2005

(65) Prior Publication Data

US 2007/0220847 A1 Sep. 27, 2007

(30) Foreign Application Priority Data

Feb. 4, 2004 (AU) .............................. 2004900510
Aug. 16, 2004 (AU) .............................. 2004904647

(51) Int. Cl.
*B01D 46/00* (2006.01)

(52) U.S. Cl. .................. 55/385.3; 55/385.1; 123/198 E

(58) Field of Classification Search ................ 55/385.3, 55/283, 350.1, 385.1; 123/41.62, 198 E
See application file for complete search history.

(56) References Cited

U.S. PATENT DOCUMENTS 3,855,976 A * 12/1974 Notaras et al. ........... 123/41.62
4,443,236 A * 4/1984 Peiler ......................... 55/282.5
4,452,616 A * 6/1984 Gillingham et al. ........... 55/302
4,826,512 A * 5/1989 Fuller .......................... 55/283
6,063,150 A * 5/2000 Peter et al. ................. 55/282.3
6,227,162 B1 5/2001 Dahlberg et al.

FOREIGN PATENT DOCUMENTS

GB 2377189 1/2003
JP 08-338327 12/1996

* cited by examiner

*Primary Examiner*—Duane Smith
*Assistant Examiner*—Tiffany N Palmer
(74) *Attorney, Agent, or Firm*—Connolly Bove Lodge & Hutz LLP; Arlene P. Neal

(57) ABSTRACT

A self cleaning filter for a small internal combustion engine (1) is disclosed. The filter (16, 36, 46) is generally rectangular and is located closely adjacent the air exit region of the engine's fan (2). The longitudinal axis of the filter is generally aligned with the direction of air flow. The filter can be flat (16), curved (36) or inclined towards the air flow (46). The arrangement permits a more compact configuration for the engine (1).

12 Claims, 5 Drawing Sheets

AIR FILTER ARRANGEMENT

This application is a National Phase filing of PCT/AU2005/000136, filed Feb. 2, 2005, which claims priority to AU 2004 900 510, filed Feb. 4, 2004 and AU 2004 904 647, filed Aug. 16, 2004.

FIELD OF THE INVENTION

The present invention relates to internal combustion engines and, in particular, to small air cooled internal combustion engines such as are used in portable appliances including chain saws, trimmers, leaf blowers and the like.

BACKGROUND ART

In recent times such small internal combustion engines have been subjected to increasingly stringent standards, particularly in relation to pollution. Such standards are having a profound influence on engine design and it is becoming increasingly difficult for the necessary performance standards specified in the environmental regulations to be met by small two stroke engines, small four stroke engines, and hybrid two/four stroke engines.

In order to meet the increasingly stringent standards, it is necessary for virtually every aspect of the internal combustion engine to be optimised. In particular, many aspects of the engine performance, including the use of exhaust catalytic mufflers, stratified combustion, and the like depend upon the rigorous control of the fuel to air ratio which must be maintained within a narrow operating range.

However, the fuel to air ratio can be significantly changed by the quality and cleanliness of the air cleaner used to filter the pre-combustion air before it enters the engine.

There are, in general, two types of air cleaners which are extensively used and these can be classified as either "wet" or "dry". Wet air filters are porous plastic foam, or similar, impregnated with a viscous liquid such as oil. Dry air filters use porous plastic foam, porous felt, a porous paper cartridge, or some other porous material. Both these type of filters require routine maintenance and, if not properly maintained, can significantly alter the fuel/air ratio. For example, if the "wet" filters have an excess of oil applied thereto, this can increase the particulate material which is present in the exhaust. If the dry types of filter become blocked to at least an appreciable extent with foreign matter such as dust, grass cuttings or the like, this can change the ratio of the fuel air mixture thereby resulting in both increased fuel consumption and an increased pollution level. Further, where a muffler catalytic converter is present, a fuel rich mixture of fuel and air can lower the operating temperature of the catalytic converter from its intended high operating temperature thereby making the catalytic converter less effective, and possibly permanently disabling the converter.

U.S. Pat. No. 3,855,976 granted to the present applicants discloses a substantially self-cleaning air filter system in which air from the fan powered by the engine was directed to pass over a fine mesh screen. The screen both had a large surface area and was substantially perpendicular to the axis of rotation of the fan. The advantage of such an arrangement is that it meant that the engine operator was not obliged to laboriously clean the air filter at frequent specified operational periods (eg every 10 hours of operation). Instead this prior art air filter needed only relatively infrequent cleaning.

However, pollution performance standards are not the only criterion required to be met by modern day small size and lightweight engines for hand held use. For such devices, the engine attached to the device is generally the most prominent part of the device. However, conventional air filters, including the one described in the abovementioned US Patent, are relatively bulky and add to the weight and size of the overall engine unit. Since such air filters can significantly add to one or more of the dimensions of the overall engine unit, they can make the appliance far more awkward to hold, and thus more awkward to use, by the operator. Another disadvantage of this extra bulk is that it adds to the cubic capacity, and one or more dimensions of, cartons in which the engines are shipped. This increases the contribution to the final price made by the cost of transport.

OBJECT OF THE INVENTION

The aim of the present invention therefore is to utilise an air filter arrangement of the general type described in the abovementioned US Patent but in such a way that the size and bulk of the overall arrangement is suitable for miniaturisation.

SUMMARY OF THE INVENTION

In accordance with the present invention there is disclosed in an air cooled internal combustion engine having a cylinder, a rotary fan powered by said engine and contained within a cowling which directs air in a flow from said fan towards said cylinder, with a substantially self cleaning and generally planar air filter located in said flow, the improvement comprising locating said filter closely adjacent an air exit region of said fan to thereby increase the velocity of air flowing over said air filter.

Preferably the air filter is located in a plane which is substantially parallel to the axis of rotation of said fan and substantially parallel to a tangent to the outer circumference of said fan.

In accordance with a second aspect of the present invention there is disclosed an air filter arrangement for an internal combustion engine having a cylinder, a rotary fan powered by' said engine and contained within a cowling which directs a flow of air from said fan towards said cylinder, said air filter arrangement comprising a generally planar air filter located in said flow and closely adjacent an air exit region of said fan to thereby increase the velocity of air flowing over said air filter.

Preferably the air filter is located in a plane which is substantially parallel to the axis of rotation of said fan and also substantially parallel to a tangent to the outer circumference of said fan.

BRIEF DESCRIPTION OF THE DRAWINGS

Preferred embodiments of the present invention will now be described with reference to the drawings in which.

In small internal combustion engines which are air cooled, a centrifugal fan driven by the engine provides the cooling air flow for the cylinder. The fan usually consists of a circular impeller having generally radially arranged blades (or curved scoops) arranged within a cowling which extends partially around the circumference or periphery of the impeller. The fan cowling is normally provided in two or more pieces, one a removable cover which mates with the other(s), the other(s) being a wall or similar structure cast with the engine block or any additional piece of cowling. The term "cowling" as used herein is used to embrace all parts of this air directing arrangement, whether able to be removed from the engine, or not.

The cowling does not extend entirely around the impeller being open on that side of the impeller facing the cylinder block. The cowling is closed on the other side of the impeller and in this region is curved so that the radial distance between the impeller and the cowling progressively increases in the direction of impeller rotation. This is clearly seen in both FIG. 2 of the abovementioned US Patent and in FIG. 2 of the present application.

The cowling extends around, and progressively radially retreats from, the impeller until an air exit region for the cowling is reached. Within the cowling both the air velocity and the volume of air flow are at a high level before the air exit region of cowling. However, on the open side of the impeller away from the cowling, for example adjacent the cylinder, the air flow is not constrained and the air velocity is relatively low.

After leaving the air exit region of the fan in the vicinity of the cylinder, the path of the air flow is no longer constrained to lie between the impeller and cowling. Instead the cross-sectional size of the air flow path increases with the consequence that the velocity of the air flow reduces. Furthermore, as the air flow spreads out over the exterior of the engine cylinder it is intended to cool, the cross-sectional area of the flow path progressively expands and the flow velocity progressively decreases.

Figure 2:
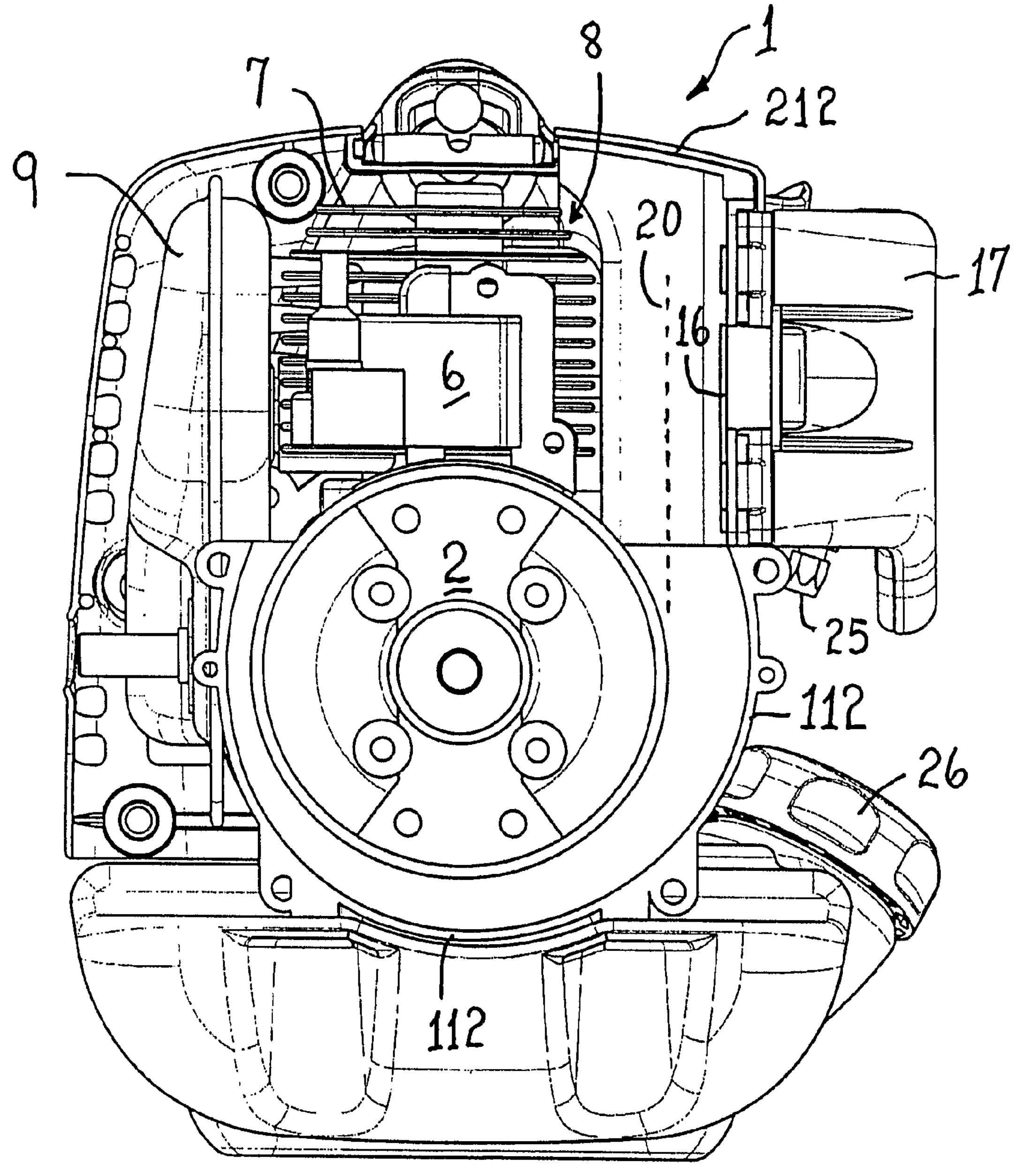
FIG. 2 is a front elevation of the engine in the condition illustrated in FIG. 1.
Figure 3:
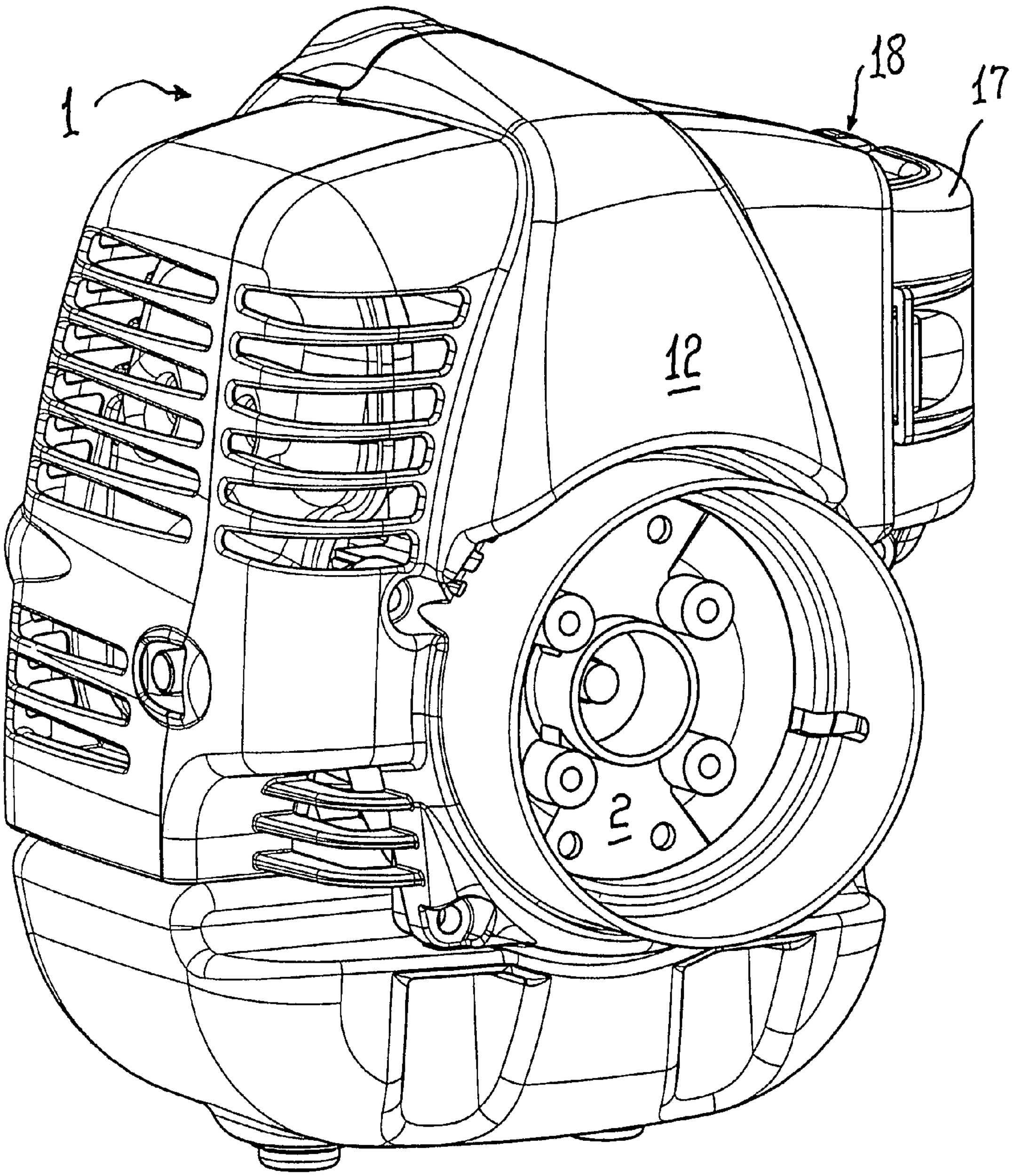
FIG. 3 is a perspective view similar to FIG. 1 but with the engine fan cowling in place.
Figure 4:
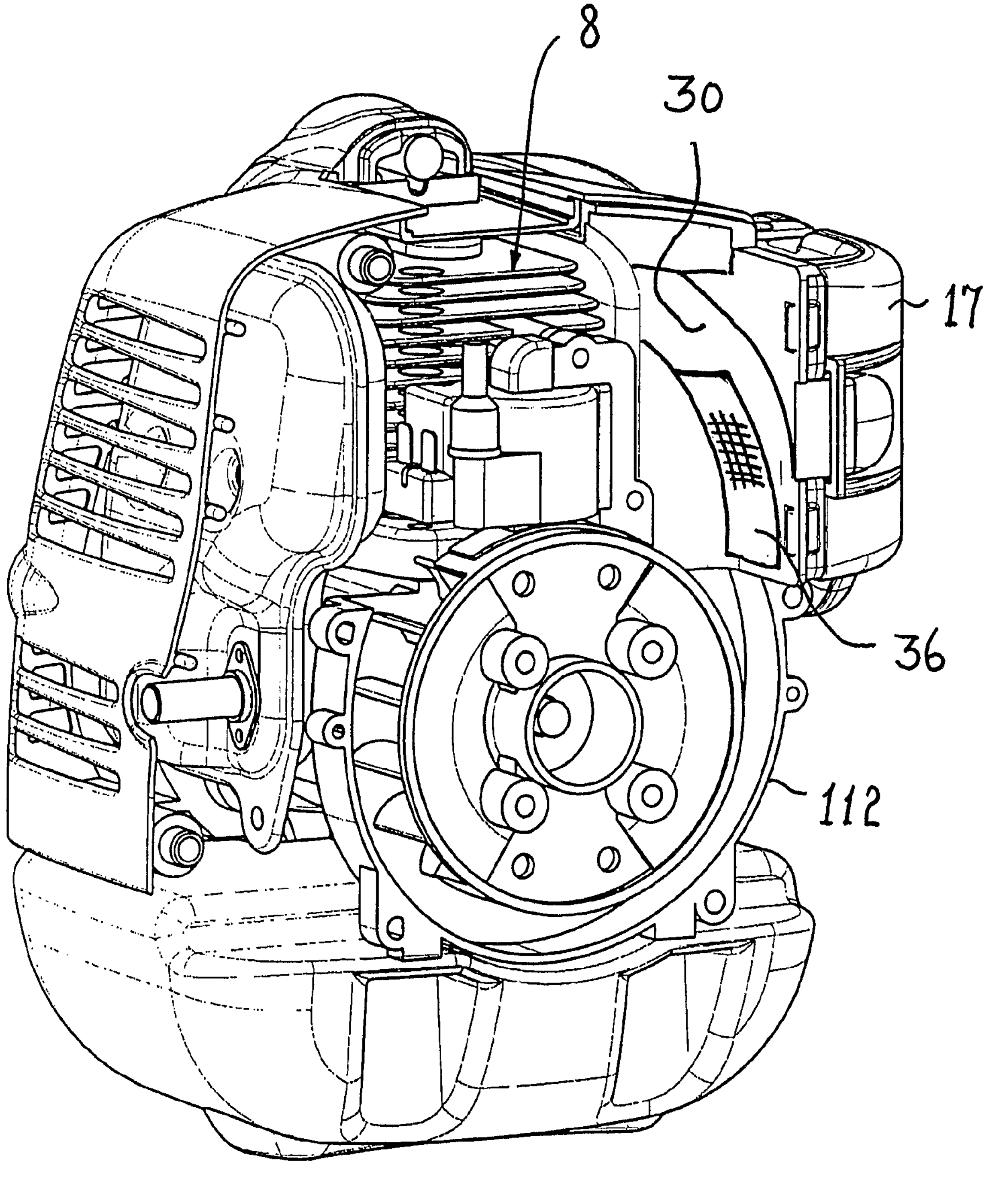
FIG. 4 is a view similar to FIG. 1 but of a second embodiment.

With the above in mind, it will be appreciated that in the abovementioned prior art US Patent, the filter medium 26 illustrated in FIGS. 3 and 4 of that patent is located a substantial distance downstream from the air exit region of the fan at the location of the air inlet 22 (FIG. 2) for the carburetor. As a consequence of the distance of the inlet 22, with its filter medium 26, from the air exit region of the fan, the velocity of the air flowing past the air filter medium 26 is much less than the exit velocity of the air leaving the fan. This is because the cross-sectional area of the air flow path has expanded appreciably by the time the air flow has arrived at the inlet 22. This is apparent from FIG. 2 of the abovementioned US Patent.

The less than maximum velocity of the air flowing past the filter medium 26 meant that the cleaning power of the air flow was not at a maximum and so the filter medium 26 is relatively large, being approximately 90 mm by 50 mm. In addition, the filter 26 still required some cleaning, although much less than prior art filters at that time.

Figure 1:
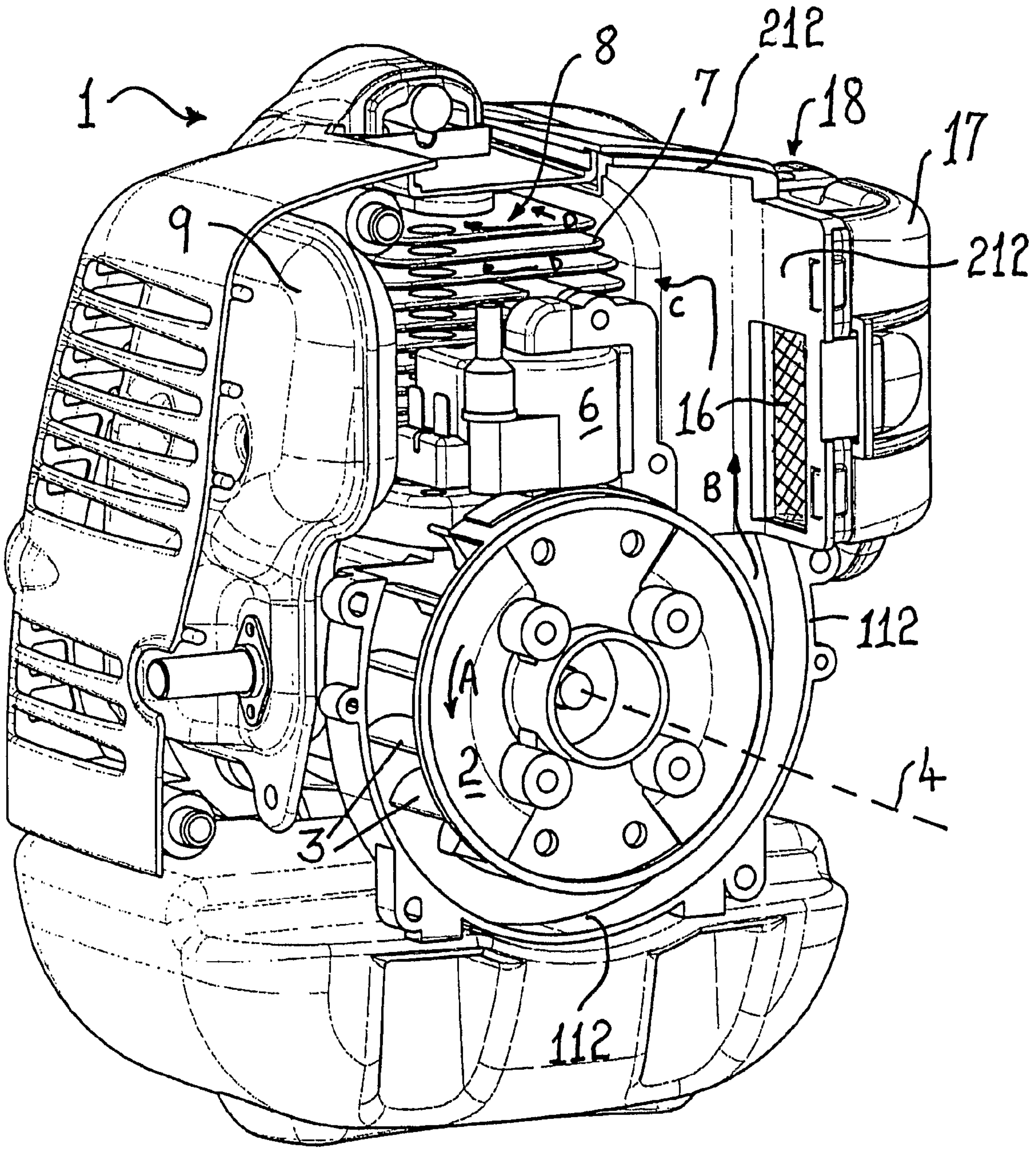
FIG. 1 is a perspective view of a small two stroke internal combustion engine of a first embodiment intended for hand held use with the fan cowling removed.

As seen in FIG. 1 of the present application, a small (typically two stroke) engine 1 is illustrated having a rotary fan 2 with blades 3. The fan 2 rotates in an anti-clockwise direction indicated by arrow A about an axis of rotation 4 indicated by broken lines in FIG. 1. Positioned above the fan 2 is a magneto ignition coil 6 behind which lie the cooling fins 7 of the engine cylinder 8. A muffler 9 is positioned adjacent the fan 2.

As illustrated in FIG. 3, during operation the fan 2 is covered by a fan cowling 12. As the fan 2 rotates, air leaves the air exit region of the fan upwardly as indicated by arrow B in FIG. 1. Thereafter this air flow bends to the left as indicated by arrow C before turning again and expanding and breaking into several streams which are substantially parallel to the crankshaft and which pass between and over the cooling fins 7 as indicated by several arrows D.

As seen in FIG. 1, a filter 16 of planar construction (and illustrated by cross-hatching in FIG. 1) extends across the opening of a curved shaped passageway 17 which leads to a substantially conventional carburetor 18.

As illustrated in FIGS. 1 and 2, the fan 2 is surrounded around part of its circumference by a lower cowling base 112 which co-operates with an upper cowling base 212. The cowling 12 (FIG. 3) mates with both the lower cowling base 112 and upper cowling base 212 when mounted on the engine 1. In FIG. 2 a broken line 20 is illustrated which is tangential with the circumference of the rotary fan 2. The filter 16 lies in a plane which is substantially parallel to the broken line 20 and which is also substantially flush with the cowling bases 112 and 212 and the cowling 12 when installed.

It follows from the above description and the drawings that the filter 16 simultaneously meets several requirements. Firstly, it is located as close as possible to the air exit region of the fan and thus in a region of very high air velocity. Secondly, the filter 16 is located in a plane which is substantially parallel to the axis 4 of rotation of the fan, and it is also substantially parallel to a tangent 20 to the outer circumference of the fan 2.

Furthermore, as is apparent from FIG. 1, the longitudinal axis of the generally rectangular filter 16 is substantially aligned with the direction of air flow as indicated by arrow B in FIG. 1.

The foregoing arrangements have a number of substantial consequences. Firstly, the positioning of the filter 16 relative to the air flow indicated by arrow B in FIG. 1 means that the face of the filter 16 illustrated in FIG. 1 is maintained free of debris such as dust, grass clippings, and the like, by the continual high velocity flow of air generated by the fan 2. In this way, no routine maintenance of the filter by the operator of the engine 1 is required. Indeed, the filter 16 seldom needs to be cleaned, if at all. Certainly, no filter cleaning needs to be specified in the list of activities (such as spark plug maintenance) which should be done at regular intervals.

Moreover, the filter 16 is able to be compactly arranged (being typically 40 mm by 20 mm). Thus the filter 16, unlike prior art air filter arrangements, does not protrude unduly from the overall periphery of the engine 1, thereby substantially reducing the overall bulk and size of the engine 1.

The particular arrangement of the filter 16 and passageway 17 enable the carburetor 18 to be positioned at 90° relative to its normal orientation so that the attachment 25 (FIG. 2), which enables a Bowden cable (not illustrated) to be attached to the carburetor 18, can be orientated so as to enable the Bowden cable to pass between the fuel tank cap 26 and the cowling base 112. This again results in a more compact engine arrangement.

Turning now to FIG. 4, in a second embodiment a filter 36 again is formed from a fine mesh filter medium and is rectangular, but is curved and lies in a curved surface 30. The surface 30 is flush with the cowling 12 at the air exit region of the fan and is curved so as to direct air towards the cylinder 8. Again the filter 36 is swept clear of debris by virtue of the substantial air flow which is directed across the face of the filter 36 and which is very much greater than the flow of air through the filter 36 and into the passageway 17 leading to the carburetor 18.

Figure 5:
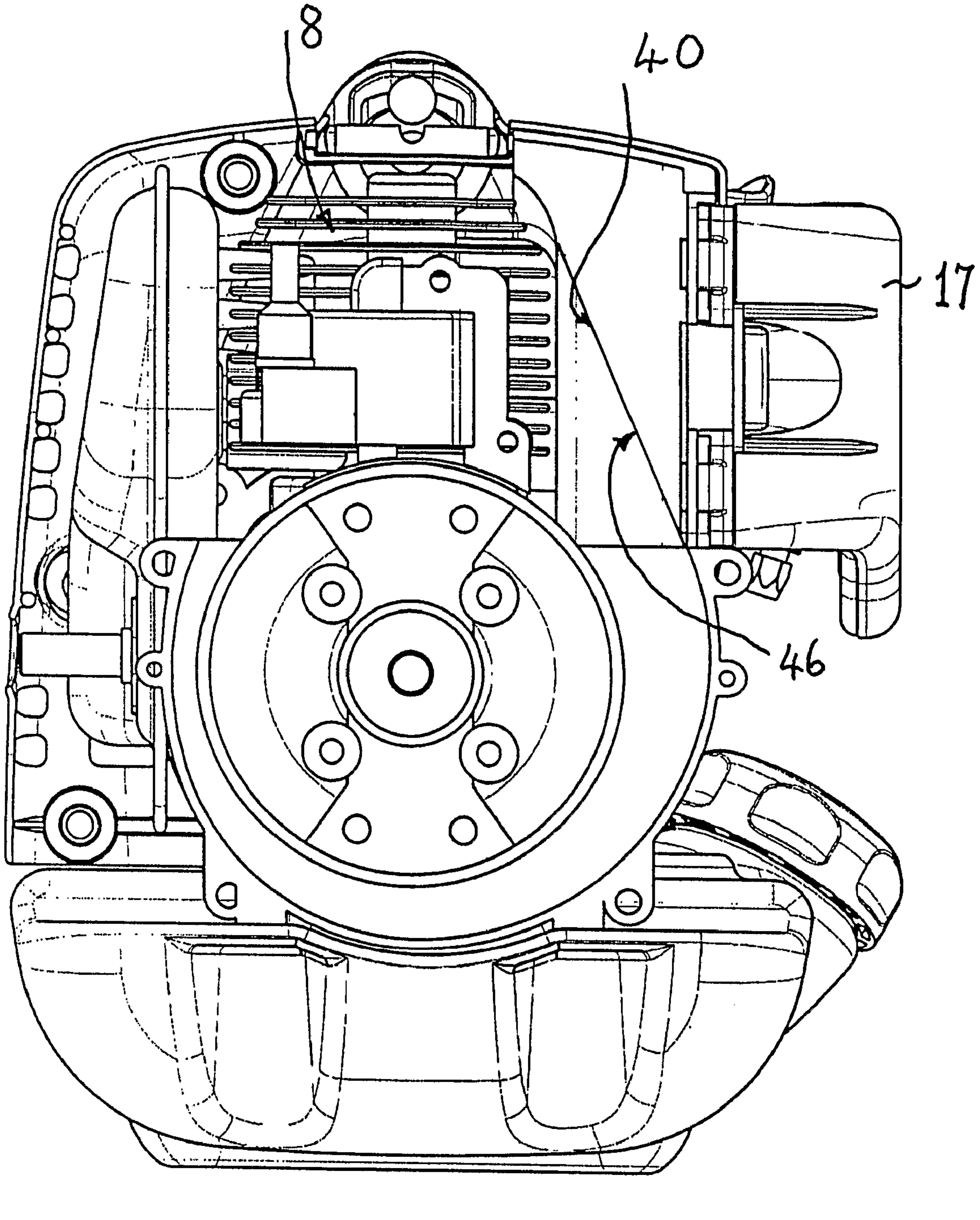
FIG. 5 is a view similar to FIG. 2 but of a third embodiment.

In a third embodiment illustrated in FIG. 5, a filter 46 is flat and lies within a flat surface 40 which is inclined to the air flow leaving the air exit region of the fan. The surface 40 also directs air towards the cylinder 8 and yet enables the majority of the air flow to pass over the surface of the filter 46 thereby sweeping it clear of any debris.

The foregoing describes only some embodiments of the present invention and modifications, obvious to those skilled in the art, can be made thereto without departing from the scope of the present invention.

The term "comprising" (and its grammatical variations) as used herein is used in the inclusive sense of "having" or "including" and not in the exclusive sense of "consisting only of".

The invention claimed is:

1. In an air cooled internal combustion engine having a cylinder, a rotary fan powered by said engine and contained within a cowling which directs air in a flow from said fan towards said cylinder, with a substantially self cleaning and generally planar air filter located in said flow, the improvement comprising:

locating said filter closely adjacent an air exit region of said fan to thereby increase the velocity of air flowing over said air filter and further locating said generally planar air filter in a plane which is substantially parallel to the axis of rotation of said fan and substantially parallel to a tangent to the outer circumference of said fan at said air exit region, wherein the entire face of the planar air filter is in a plane which is parallel to the axis of rotation.

2. The air cooled internal combustion engine as claimed in claim 1, wherein said cowling is curved at least partially around said fan and said air filter is located in a plane which is curved in like fashion to said cowling.

3. The air cooled internal combustion engine as claimed in claim 1, wherein said air filter is located in a plane which is included into the flow of air leaving said air exit region.

4. The air cooled internal combustion engine as claimed in claim 1, wherein said filter is generally rectangular and has its longer axis substantially aligned with the direction of said air flow.

5. The air cooled internal combustion engine as claimed in claim 1, wherein said filter is substantially flush with said cowling.

6. An air filter arrangement for an internal combustion engine having a cylinder, a rotary fan powered by said engine and contained within a cowling which directs a flow of air from said fan towards said cylinder, said air filter arrangement comprising:

a generally planar air filter located in said flow, in a plane which is substantially parallel to the axis of rotation of said fan and also substantially parallel to a tangent to the outer circumference of said fan at an air exit region of said fan, and closely adjacent said air exit region of said fan to thereby increase the velocity of air flowing over said air filter, wherein the entire face of the planar air filter is in a plane which is parallel to the axis of rotation.

7. The arrangement as claimed in claim 6, wherein said cowling is curved at least partially around said fan and said air filter is located in a plane which is curved in like fashion to said cowling.

8. The arrangement as claimed in claim 6, wherein said air filter is located in a plane which is inclined into the flow of air leaving said air exit region.

9. The arrangement as claimed in claim 6, wherein said filter is substantially flush with said cowling.

10. The arrangement as claimed in claim 6, wherein said filter is generally rectangular and has its longer axis substantially aligned with the direction of said flow of air.

11. The air cooled internal combustion engine as claimed in claim 1, wherein the air filter is positioned relative to the fan so that air exiting said air exit region of said fan passes over said air filter without changing direction.

12. The arrangement as claimed in claim 6, wherein the air filter is positioned relative to the fan so that air exiting said air exit region of said fan passes over said air filter without changing direction.

* * * * *